United States Patent [19]

Fukuyoshi et al.

[11] Patent Number: 5,258,930
[45] Date of Patent: Nov. 2, 1993

[54] PISTON RING WEAR DIAGNOSTIC DEVICE AND PROCEDURE THEREFOR

[75] Inventors: Tadashi Fukuyoshi; Takeo Takaishi; Keizo Goto; Mikio Koga; Shoichi Kanegae, all of Nagasaki, Japan

[73] Assignee: Mitsubishi Jukogyo Kabushiki Kaisha, Tokyo, Japan

[21] Appl. No.: 642,304

[22] Filed: Jan. 18, 1991

[30] Foreign Application Priority Data

Jan. 19, 1990 [JP] Japan ................. 2-8381

[51] Int. Cl.$^5$ ........................................... G01M 15/00
[52] U.S. Cl. ........................ 364/563; 364/424.03; 73/120
[58] Field of Search ........... 364/550, 551.01, 551.02, 364/552, 563, 505, 506, 507, 424.03; 73/9, 117.3, 120; 324/229; 33/605, DIG. 17

[56] References Cited

U.S. PATENT DOCUMENTS

| | | | |
|---|---|---|---|
| 3,441,840 | 4/1969 | Rundle | 324/34 |
| 4,143,319 | 3/1979 | Rouam | 324/219 |
| 4,592,964 | 6/1986 | Buran et al. | 428/610 |
| 5,062,298 | 11/1991 | Falcoff et al. | 364/563 |

FOREIGN PATENT DOCUMENTS 51-129552  11/1976  Japan .
63-157611  10/1988  Japan .

OTHER PUBLICATIONS

Japanese Abstract, vol. 13, No. 475 (P-950) (3823) Oct. 27, 1989 & JP-A-1 187 401 (Mitsubishi Heavy Ind. Ltd.) Jul. 26, 1989.
Japanese Abstract, vol. 12, No. 441 (P-789) (3288) Nov. 21, 1988 & JP-A-63 169 513 (Asahi) Kuma Ind. Co. Ltd.) Jul. 13, 1988.
Japanese Abstract, vol. 13, No. 412 (P-932) (3760) Sep. 12, 1989 & JP-A-1 152 305 (Fuji Electric Co. Ltd.) Jun. 14, 1989.
Japanese Abstract, vol. 10, No. 243 (P-489) (2299) Aug. 21, 1986 & JP-A061 075 207 (Mitsubishi Heavy Ind. Ltd.) Apr. 17, 1986.
Japanese Abstract, vol. 4, No. 58 (P-9) (540) Apr. 30, 1980 & JP-A-55 029 734 (Mitsubishi Jukogyokk.) Mar. 3, 1980.

*Primary Examiner*—Thomas G. Black
*Assistant Examiner*—Michael Zanelli
*Attorney, Agent, or Firm*—Jacobson, Price, Holman & Stern

[57] ABSTRACT

A device for diagnosing wear on the sliding surface of a piston ring (07a) on a piston (01) which is reciprocating inside a cylinder (02), as applied in diesel engines and compressors, etc. A through-hole (103) is bored in the cylinder wall (02) to extend from the exterior to the interior, and an electric displacement sensor (100) such as, for example, an eddy current type displacement sensor, is inserted into the through-hole inwardly toward the cylinder. The displacement sensor is utilized to measure a difference in an amount of wear between one piston ring (07a) coated with a wear resistant material (102) and another piston ring (07b, 07c, 07d) without wear resistant material coated thereon, and its initial data and data to be collected after use are computed (114), permitting an operator to diagnose the wear on the piston rings based on the change in thickness of the wear resistant material in use.

3 Claims, 9 Drawing Sheets

PISTON RING WEAR DIAGNOSTIC DEVICE AND PROCEDURE THEREFOR

BACKGROUND OF THE INVENTION

The present invention relates to a device for use to diagnose wear of piston rings which are used in diesel engines installed on vessels or motor-vehicles, and such industrial machines as compressors etc., and a diagnostic procedure therefor.

Traditionally, it has been a common procedure to check the amount of wear on a piston ring which used in an engine by withdrawing the ring while the engine is inoperative and then measuring wear surface thickness, or alternatively in two-cycle engines it has been only estimated by an operator making a visual inspection of the clearance between opposite engaging end portions of the piston ring by looking through a scavenging port when such an access to the opposite engaging end portions is allowed for him by a casual chance. These prior art procedures, however, have a problem in that they can be taken only when the engine remains inoperative, and in addition require very labor-intensive work.

Piston rings are used in reciprocating engines tend to be worn out easily or excessively, as a result of their sliding movement inside the cylinder. As the wear of the piston rings increase, the engine output decreases to result in engine troubles such as breakage and seizure etc., of the piston ring. For this reason it is very convenient if the replacement of the piston ring may be made prior to the occurrence of such engine trouble. It is thus needed to estimate the amount of wear of piston rings. In particular, with the trend of requirement for higher engine outputs, piston rings experience a greater accelerated rate of wear than ever, and accordingly it is often the case that a wear resistant material is coated onto the top ring, and still further onto the second ring. In such a case, the effective life of a piston ring can be determined by knowing the time when the wear resistant material has been worn out to expose its outer surface, and so it would be very convenient if the wear amount of the coating material can be determined precisely.

One example of traditional diesel engines is shown in FIG. 17 wherein the combustion chamber in the traditional diesel engines is shown in a cross-sectional view.

In this drawing, there are shown a pistol 01, a cylinder liner 02, a cylinder cover 03, a combustion chamber 04, an exhaust valve 05, a fuel valve 06, and piston rings 07 (including a top ring 07a, a second ring 07b, a third ring 07c and an end ring 07d). The wear of a traditional piston ring has been checked visually in accordance with a procedure wherein the piston ring 07 is withdrawn, for example, while the vessel is in a dockyard for repairing etc., and the thickness of the ring 07 surface is measured, or alternatively a clearance between opposite engaging end portions of the ring 07 are visually checked by looking through a scavenging port.

On the other hand, in traditional diesel engines, fuel is burned after being injected from the fuel valve 06 into the combustion chamber 04 when the piston reaches at around top dead center, and the internal pressure is elevated under such energy, thereby causing the piston 01 to move downwardly to rotate the crank shaft (not shown), and the piston returns back to its top dead center under inertia force.

Diesel engines are operated by repeating this operational cycle, and this operational movement causes the piston ring 07 attached on the outer surface of the piston 01 to slide relative to the cylinder liner 02. They thus wear out and sometimes cause several disadvantage such as abnormal wear, when adverse factors are present such as imperfect lubrication, metal-to-metal contact between components, and the development of corrosion and entrapment of dust etc., Excessive wear of the piston ring can cause adverse effects such as engine output reduction, cylinder breakage, and liners seizure etc., and a serious trouble must be forestalled by keeping a constant watch of the state of wear. Moreover, if the amount of wear of piston rings can be constantly monitored, a time for the replacement of the piston rings may be determined in advance, and any worn part may be replaced immediately upon the ship entering into the dockyard for repair etc., for example, and thus a substantial economic merit may be derived.

However, in accordance with the prior technique for checking the wear amount of piston rings, the procedure step for withdrawing the piston and subsequentially measuring its reduction in surface thickness, or alternatively visually checking the opposite engaging end portions of the ring by an operator looking through the scavenging port has been carried out only when the ship enters into the dockyard for repair, or when the machine is transported into a mill, as above-described, and therefore a substantial labor work has been needed. Moreover, the interval of time between the frequency of checks to be taken is long, and so it was problematic that a suitable preventive measure might not be taken timely against excessive wear of the piston ring.

BRIEF SUMMARY OF THE INVENTION

The present invention has been made with the above state of the art as a background, and one object is to provide a device for detecting the amount of wear of wear resistant materials coated over the outer surface of piston rings constantly from moment to moment, and thereby allowing an operator to estimate the remaining effective life of the piston ring with knowledge of the state of wear and the rate of wear.

Another object of the present invention is to provide a procedure for detecting the worn out thickness of the wear resistant material coated over the outer surface of a piston ring constantly from moment to moment, by eliminating the drawbacks in the prior art as described.

To achieve these objects of the invention as above-described, the present invention has been made and is essentially as described in (1) and (2) below.

(1) A device for diagnosing the wear on the sliding surface of a piston ring mounted on a piston which reciprocates in a cylinder, wherein a through-hole is bored in the wall of the cylinder to extend from the outside into the interior, an electric displacement sensor is inserted into the through-hole inwardly toward the cylinder, means for determining a difference in wear amount between one piston ring coated with a wear resistant material and another piston ring not coated with wear resistant material by means of the electric displacement sensor, and means for computing the thickness of the wear resistant material coated over the piston ring with a measurement output to be issued from the measuring means whereby wear of the piston ring is diagnosed from the thickness of the wear resistant material outputted from the computing means.

The operation of the invention will be described hereinbelow.

It is a recent tendency for diesel engines to adopt the piston ring which has its sliding surface coated with a wear resistant material such as a chromium and the like in order to improve the wear resistant characteristics of the piston ring. However, such material is not used entirely for all portions of the piston ring, but is solely restricted to an area adjacent to the combustion chamber or at best used up to the second ring area. The end ring is formed from a cast material (iron).

An abnormal wear takes place mainly on the top ring or the second ring.

Consequently, in order to provide a wear diagnosis device of the piston ring, it would be sufficient to provide any suitable means which would allow an operator to detect the reduced thickness of the wear resistant material coated over the top ring.

The afore-described wear diagnostic device is adapted to detect the thickness of the wear resistant material constantly from moment to moment for thereby permitting an operator to estimate a possible effective life of the ring so as to know a time for replacement of the worn ring with a new one with a sufficient time in advance while at the same time eliminating the possibility of fatal damage to the engine. Specifically, when the ring attached at the outer surface of the piston is caused to pass beyond, for example, the front surface of the eddy current type displacement sensor attached to the side surface below the scavenging port of the liner due to the up-and-down movement of the piston, the output is then generated which corresponds with the respective rings. The variation in the output magnitude is smaller for the ring coated with the wear resistant material than with the ring having no wear resistant material coated thereon. As the amount of wear of the wear resistant material increases to such a degree that its surface thickness is reduced due to the sliding movement of the ring, the variation in the output magnitude from the sensor becomes more severe and would eventually be equal with the output level from the end ring, once the wear resistant material is completely worn away.

Consequently, it is possible for an operator to determine a suitable time for replacement of the worn ring with a new one, by keeping a continuous monitor on a difference in the output magnitude between the ring coated with the wear resistant material and the end ring, and such replacement may be carried out in a very timely manner in response to the decrease in such difference. An optimum replacement time may also be estimated in accordance with a rate at which the difference in the output magnitudes is reduced.

As above-described, the wear diagnostic device of the present invention for the piston ring may provide several advantages as described below.

① The wear amount of the ring may be detected constantly from moment to moment during operation, and accordingly the effective life of the ring may be estimated, warning an operator to replace the piston ring a sufficient time in advance and allowing him to make an arrangement of spare parts and repairing works before the effective life for the ring. This results in quick and a smooth execution of the repair work.

② Any imperfections of the ring may be detected with an on-line basis, and so a proper countermeasure may be taken in advance to forestall any serious accident.

(2) A procedure for diagnosing the wear on the sliding surface of the piston ring attached to the piston which is reciprocating inside the cylinder, wherein said procedure comprises inserting a piston ring with wear resistant material coated thereover in the thickness of $\delta$ and another piston ring without any wear resistant material coated thereover, then inserting an electric displacement sensor into a through-hole in the cylinder wall leaving a clearance at the tip end thereof, connecting an instrumental device with the electric displacement sensor, reciprocating the piston, and operating the instrumental device to record the output of the displacement sensor relative to each of the piston rings and the piston outer wall when the piston ring passes in front of the electric displacement sensor, and comparing a difference in the output magnitude between two piston rings, i.e., the ring with the wear resistant material and one without any coating material with basis on their data to be provided before and after use, and computing an amount of the wear resistant material reduced from the initial coating thickness $\delta$ of the wear resistant material.

In other words, it may be mentioned that;

① while a wear resistant material such as chromium etc., is applied over the top ring and the second ring etc., which tend to be severely worn, and no such wear resistant material is applied over the ring such as an end ring etc., which tend to be less worn, the effective life of the ring is determined by knowing the time when its wear resistant material is completely abraded away.

② As for instance, an eddy current type displacement sensor (a sensor adapted to measure a distance from the tip end of the sensor to a target (an object to be used for measuring a distance)) may generate an output the magnitude of which is in proportion to a distance to the target, and its output magnitude is varied depending on the type of metals to be used as the target. The variation in the magnitude of the output is substantially less in the wear resistant material than in a casting material (iron) used as a base metal for the ring. Because the wear resistant material which has been applied over the base material for the ring is caused to have an extremely reduced thickness, i.e., a maximum thickness of about 0.5 mm, and when the thickness is measured by means of the eddy current type displacement sensor with a certain distance spaced therebetween, its output magnitude may vary in inverse proportion with the thickness of the wear resistant material.

A hole is bored in the side surface area adjacent to the scavenging port of the liner, taking the above two points into account, the hole extending through the side surface from the exterior into the interior, and the eddy current type displacement sensor is placed inside the hole in order that the thickness of the wear resistant material may be measured by relying on an output to be produced from the ring when it passes thereover.

③ Because an even pressure distribution may not be expected for the ring due to the gas escaping to flow through the opposite engaging end portions thereof, and consequently its amount of wear may be variable in places. To discriminate a worn area, a groove is defined beforehand circumferentially through the surface of the base metal at a region where a wear resistant material is coated, and then the eddy current type displacement sensor is positioned so as to make a searching operation during operation, and thereby establishing a relationship between the amount of wear and the position of the ring.

A hole is bored in the side surface area adjacent to the scavenging port of the liner, taking the above three points into account, the hole extending through a side surface from the exterior into the interior, and the eddy current type displacement sensor is placed inside the hole in order that the relationship between the amount of the wear and the ring position may be measured by relying on an output to be produced from the ring when it passes thereover.

(4) Although a procedure is disclosed wherein a groove is defined through the outer circumference of the base material of the ring so as to specify the outer circumferential position of the ring in this invention, its understanding may be facilitated by employing a binary system by which data thus obtained are collected and provided in a tabulated format.

The operation of the invention is identical with that in the previous embodiment, but further description should be made on several points as follows;

In order to provide reference means for specifying a surface portion of the ring, a groove is defined to run in parallel with the circumferential direction of the ring, prior to the application of the wear resistant material over the base material for the ring. In order to discriminate the position by means of the groove, two methods may be suggested, i.e., one relying on the number of the grooves and one relying on the position of the grooves. The ring which has been processed in this way is brought into engagement with the piston, and then the engine is actuated to run, to be followed by actuation of the eddy current type displacement sensor to make a searching action over the surface of the ring, allowing an operator to detect the number and the position of the grooves which correspond with the target position. Thus, an operator may know the amount of wear on a particular ring portion.

The present invention constituted as above, can provide a procedure for knowing the amount of wear of the wear resistant material and its position on the piston ring constantly from moment to moment. As an effect, the effective life of the ring may be determined by knowing the time when the wear resistant material will be fully worn out, and therefore the invention may provide an operator with means for estimating the remaining effective life of the piston ring.

DETAILED DESCRIPTION OF PREFERRED EMBODIMENTS

Figure 1:
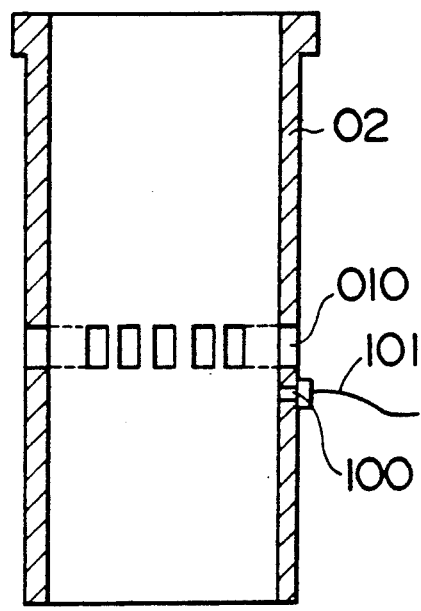
FIG. 1 is a cross-sectional view of the cylinder liner in an embodiment of the invention.
Figure 2:
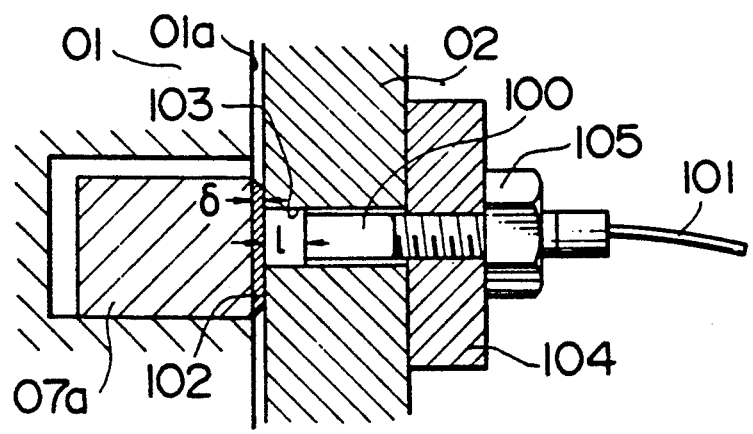
FIG. 2 is a cross-sectional view showing the cylinder liner with the wear resistant material coated on a piston ring passing thereover in front of the eddy current type displacement sensor inserted into a through-hole in the cylinder liner.
Figure 3:
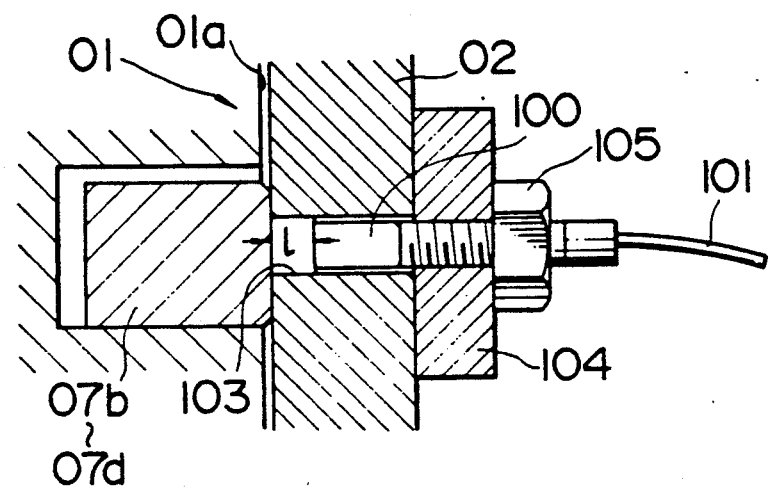
FIG. 3 is a cross-sectional view showing the cylinder liner without the wear resistant material coated on a piston ring passing thereover in front of the eddy current type displacement sensor.

Now, preferred embodiments of the present invention will be described hereinbelow, with reference to the accompanying drawings.

First Embodiment

The first embodiment of the present invention will be described with reference to FIGS. 1–5.

In these Figures, there are shown a piston 01 and an scavenging port 010. There are also shown a cast cylinder liner 02 into which the piston 01 may loosely engage. There are also shown a through-port 103 defined through the cylinder liner, and an eddy current type displacement a sensor 100 which is attached in the through-hole 103 leaving a clearance at the tip end thereof. A numeral 101 represents a lead wire for the eddy current type displacement sensor 100, a numeral 01a represents the outer surface of the piston 01, 104 represents a mounting plate of the eddy current type displacement sensor, the mounting plate being used to support the eddy current type displacement sensor in position, and 105 represents a nut for securing the eddy current type displacement sensor in position. There are also shown a piston-ring 07a (shown only as the top ring in this embodiment) and the wear resistant material (for example a chromium etc.,) 102 used to coat the outer surface of the cast iron piston ring 07a. Numerals 07b–07d represent the cast iron piston rings (a second ring, a third ring and an end ring in this embodiment) which are not coated with the wear resistant material.

Also, the symbol $\delta$ represents a thickness of the wear resistant material 102, and l represents a distance between the sliding surfaces of the rings $07_a \ldots 07_d$ and the tip end of the sensor 100.

Figure 4:
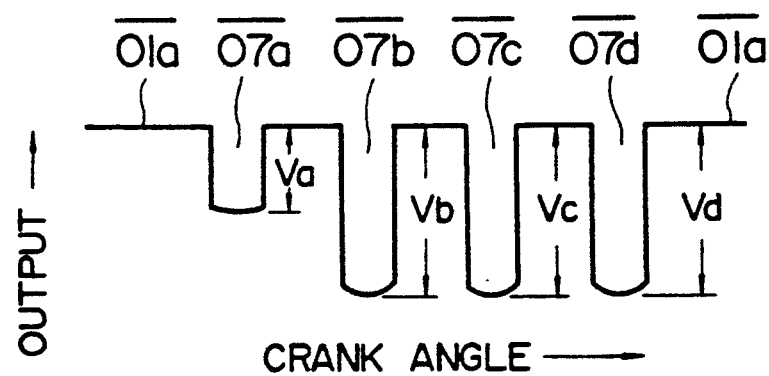
FIG. 4 is a view showing an output wave-form issued from the eddy current type displacement sensor.

FIG. 4 shows a wave-form to be provided by the sensor 100, wherein the horizontal axis represents a crank angle (time), the vertical axis represents an output voltage, the wave form $\overline{7a}$ represents the output provided by the top ring (the ring coated with the wear resistant material) and the wave forms $\overline{7b}$, $\overline{7c}$ and $\overline{7d}$ represent the outputs provided by the second ring, the third ring and the end ring (those rings having no wear resistant material coating) respectively.

Figure 5:
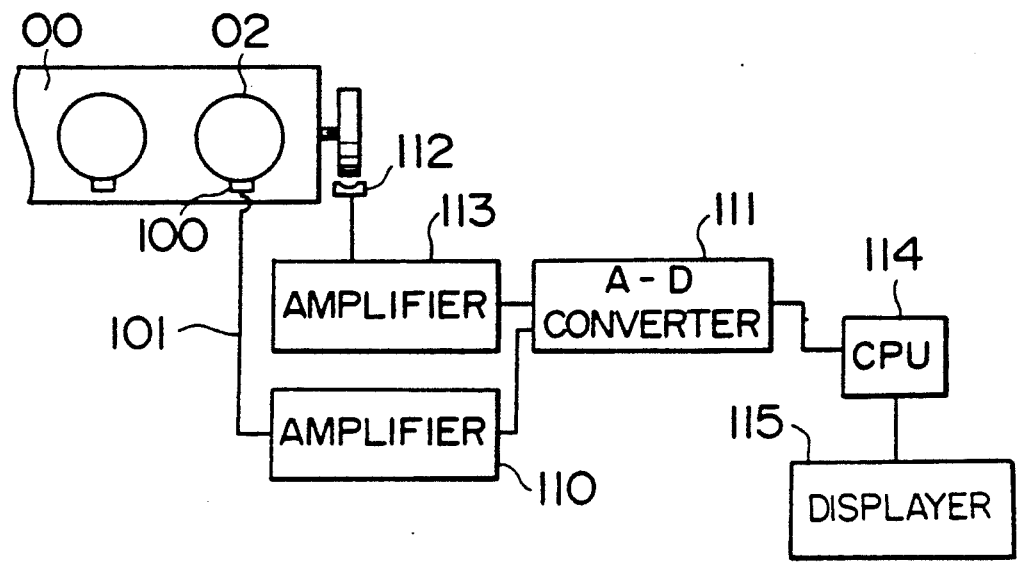
FIG. 5 is a block diagram showing the constitution of the wear diagnostic device in the embodiment of the invention.

FIG. 5 is a block diagram showing how the wear diagnostic device is constructed, wherein there are shown an engine 00, a crank-angle detector 112, amplifiers 110 and 113, an A/D converter 111, a computer or a central processing unit (CPU) 114, a displayer 115 and a groove 200 (FIG. 6) which is defined through the base metal of the piston ring.

The principle and operation of the present invention will be described hereinbelow, with reference to FIGS. 2 through 5 and FIG. 17. The sensor 100 has its output varied depending on the up-and-down reciprocating movement of the piston 01. As shown in FIG. 4, the output may be at the level of $\overline{01a}$, if the piston 01 moves to such a position where its outer surface 01a is in front of the sensor 100. When the piston 01 moves so that the top ring 7a comes in front of the sensor 100, the output may be varied by the magnitude of Va. Furthermore, when the piston 01 is moved to cause the second ring 7b to be in front of the sensor 100, the output may be varied by the magnitude of Vb. Similarly, the third ring and the end ring may vary their outputs by the magnitude of Vc and Vd respectively.

In the case of the rings 7b, 7c and 7d, the following equation may be established, because a constant distance is maintained between the tip end of the sensor 100 and the sliding surface of the ring.

$$Ve=Vb=Vc=Vd \quad (1)$$

where, the symbol Ve represents a variation in the output magnitude from the piston ring without the wear resistant material 102 coated thereon, and the piston ring 7a coated with the wear resistant material 102 experiences less magnitude of variation Va in output, which is smaller than that of the piston ring without the wear resistant material coating 102. When the symbol $\delta$ is small, a relationship substantially such as $\delta \propto Ve-Va$ may be derived. It may well be considered that the variation in the output magnitude is in inverse proportion with the thickness of the wear resistant material coating, when the wear resistant material is thinly coated.

Hence, if it is assumed that when the thickness of the wear resistant material of the piston-ring was $\delta o$ while it was a newly made article (before use), its output magnitude variation was Vao (initial data), the thickness of the wear resistant material being used was $\delta$, its output magnitude variation was Va, and the output magnitude variation of the ring without any wear resistant material coated was Ve, then an equation is established as given below;

$$\delta=(Ve-Va)/(Ve-Vao)\times \delta o \quad (2)$$

In the above equation (2), since the values for Ve, Vao and $\delta o$ are known, it is thus possible for an operator to measure the thickness $\delta$ of the wear resistant material constantly from moment to moment.

In the system of FIG. 5, the output from the sensor 100 is amplified and rectified through an amplifier 110 and converted into digital values by means of the A/D converter 111, and then fed into the computer or the central processing unit (CPU) 114 so that the thickness $\delta$ of the wear resistant material 102 can be computed in accordance with the equation (2).

The rings are discriminated by means of the crank-angle detector 112.

As for instance, where it is assumed that the crank-angle detector 112 has its origin established at a top dead center, the time needed for the signal to make a full turn is T seconds, and it needs a time period of Ta for the displacement sensor 100 to issue a signal for the top ring 7a from the signal to be generated by the crank-angle detector 112, than it follows that the crank-angle $\theta a$ may be expressed by the equation as set forth below.

$$\theta a= Ta\times 360/T \quad (3)$$

The signal of the top ring 7a which will be issued during its operation can be obtained in accordance with the equation (3), by employing a procedure wherein a crank-angle $\theta a$ of the top ring 7a is detected beforehand at the moment when the top ring moves passing in front of the displacement sensor 100. The signals to be produced from other rings may be obtained in a similar manner.

In this way, it can be readily judged which one of the piston rings is in correspondence with the output waveform in FIG. 4 and consequently the values Ve and Va in the equation (2) may be known. Thus, a thickness $\delta$ of the wear resistant material 102 may be obtained, and subsequently its results may be displayed on a displaying device 115.

In FIG. 4, there is a relationship shown such as $Ve=Vb=Vc=Vd$ and $Va\leq Ve$, and therefore the equation (2) may be calculated, which means that the crank-angle detector 112 and the amplifier 113 are not essentially required to be included as components.

In the meantime, selection of the materials such as WC, WC+Co, sintered sterite, carbon ceramics, $Cr_3C_2$+NiCr, Mo+Co alloy, and Co+Mo+Cr alloy and the like may be possible other than Cr, as a wear resistant material for the piston ring.

The first embodiment of the invention has been described as above, and the characteristics of the wear diagnostic device of the present invention may be summarized as that, wherein a hole is bored in the side surface area adjacent to the scavenging port of the liner, taking the above two points into accounts, said hole extending through the side surface from the exterior into the interior, and an electric displacement sensor such as, for example, the eddy current type displacement sensor is placed inside the hole in order that the thickness of the wear resistant material may be measured by making use of an output to be produced from the ring when the ring passes thereover.

Second Embodiment

Figure 9:
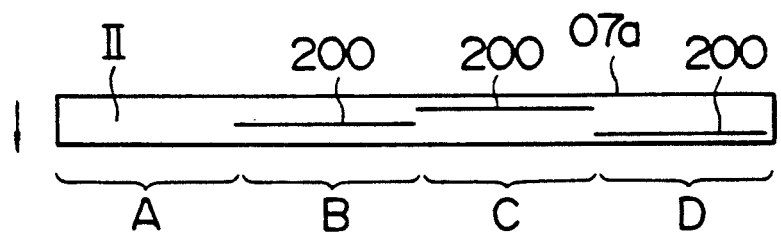
FIG. 9 is a development view of the outer surface of the piston-ring which is divided circumferentially into four equal portions and wherein a circumferential groove is defined at different positions of three portions which corresponds with the vertical positions of the base metal of the ring.
Figure 10:
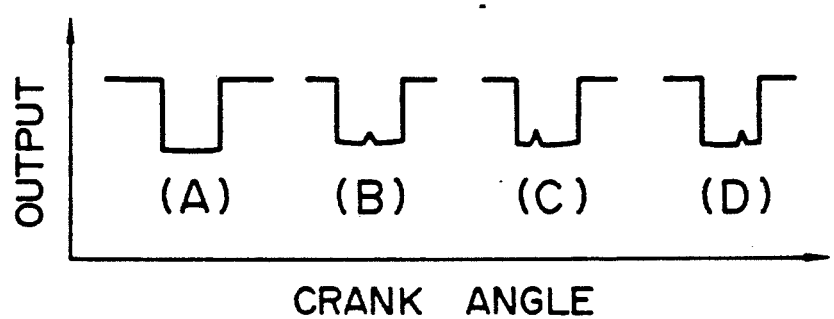
FIG. 10 is a view showing output wave-forms issued from the eddy current type displacement sensor located at a position which corresponds with respective circumferential portions A, B, C, D of the ring, for the grooved piston-ring with wear resistant material coated thereover in FIG. 9.

The second embodiment of the present invention will be described hereinbelow. As for the construction of the invention, the outer circumference of the top ring 07a of the piston ring is divided into four equal portions as respectively identified with the symbols A, B, C and D, as shown in FIGS. 9 and 10. The portion A of the base metal with the wear resistant material coated at respective positions has no groove to be described later.

The circumferential V-shaped grooves are defined at a vertical center part through the portion B, an upper part of the portion C and a lower part of the portion D. This ring will be referred to as the ring II. A groove 200 (FIG. 6) is defined through the outer circumferential surface of the base metal of the piston ring.

Figure 6:
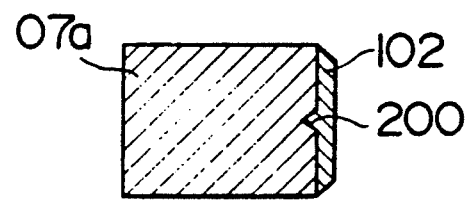
FIG. 6 is a cross-sectional view showing a piston-ring having a circumferential V-shaped groove in the surface of the base metal upon which the wear resistant material is coated.
Figure 7:
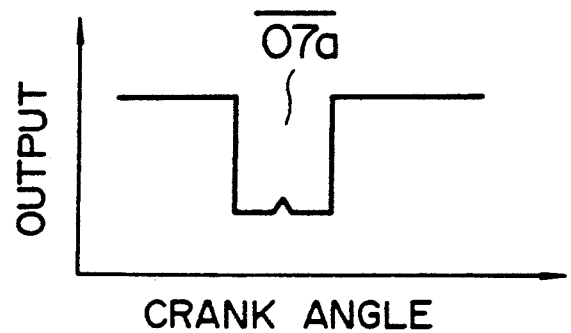
FIG. 7 is a view showing an output wave-form issued from the eddy current type displacement sensor for the piston-ring in FIG. 6.
Figure 8:
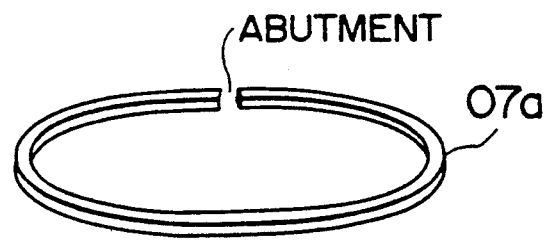
FIG. 8 is a perspective view of a piston-ring.

The operation of the second embodiment will be described. As described in the first embodiment, a great measuring error may possibly take place, if it remains unknown which part of the ring 07a has been measured. As shown in FIG. 6, where the circumferential V-shaped groove 200 is defined through the base metal underlaying the wear resistant material, the shadow of the V-shaped groove is provided as a convex image in the output wave-form. This output wave-form to be issued from the eddy current type displacement sensor is formed in such an image as shown in FIG. 10, when the ring II of the second embodiment is utilized, wherein the magnitude of the variation in the output may be observed to be in an inverse proportion with the thickness of the wear resistant material 102, and the image of the groove 200 defined in the base metal is overwrapped on the output wave-form, and consequently it may be possible for an operator to know which part of the circumferential ring portion has been measured based on the image of the groove 200.

Third Embodiment

Figure 11:
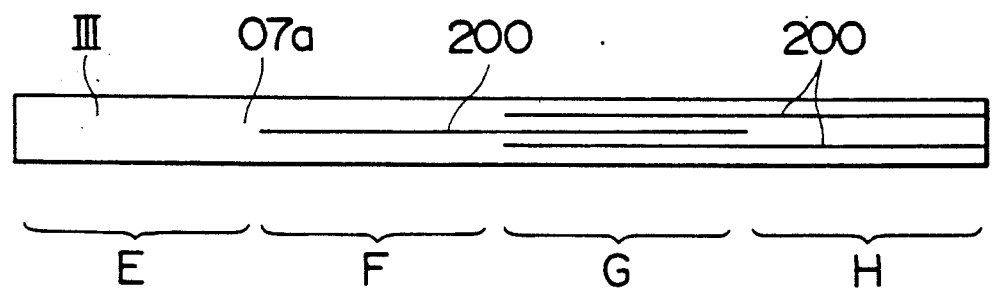
FIG. 11 is a development view of the piston ring which optionally has 1~3 circumferential grooves, or no such groove, at three positions which correspond with the vertical direction of the ring, by dividing the outer circumference of the piston ring circumferentially into four equal portions.
Figure 12:
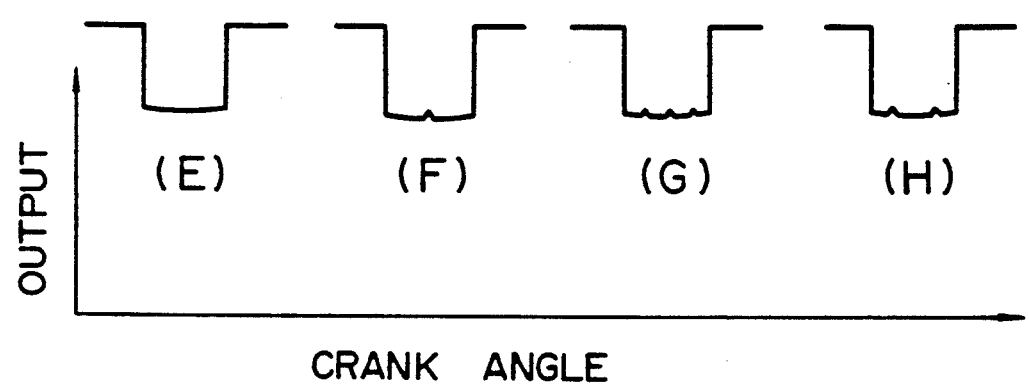
FIG. 12 is a view showing an output wave-forms issued from the eddy current type displacement sensor provided at a position which corresponds with respective circumferential portions E, F, G, H of the grooved piston ring in FIG. 11 for a piston ring having an outer surface coated with the wear resistant material thereover.

The third embodiment of the invention will be described hereinbelow. The third embodiment is constructed, as shown in FIG. 11 and 12, such that the outer circumference of the ring 07a with the wear resistant material coated thereover is equally divided into four portions respectively as identified with the symbols E, F, G and H. The circumferential groove 200 may be optionally provided in these portions. No such groove is defined in the portion E. A single groove is defined in a width-wise center part of the portion F, and three grooves, i.e., the upper, the middle and the lower grooves are defined through the portion G, whereas two grooves, i.e., the upper and the lower grooves are defined through the portion H. The ring having these grooves therein is referred to as the ring III.

The operation of the third embodiment will be described hereinbelow. By measuring the output for the ring III utilizing the eddy current type displacement sensor 100, similar wave-forms as shown for the ring II are provided, that is, the output wave-form of the portion E in FIG. 11 of the piston ring III is as shown at portion (E) in FIG. 12, and sequentially that of the portion F as shown at (F) in FIG. 12, that of the portion G as shown at (G) in FIG. 12, and that of the portion H as shown at (H) in FIG. 12, respectively. When the engine is operated, the piston ring may continue rotating about the piston shaft if no stop means are provided, and therefore it is a matter of pure casual chance that a particular part of the piston ring is measured. However, any part of the ring may be rotated sooner or later. Thus, it may be possible for the piston ring 07a to identify the wear amount of the coated resistant material 102, and its circumferential position, in the same manner as that taken for the second embodiment.

Fourth Embodiment

Figure 13:
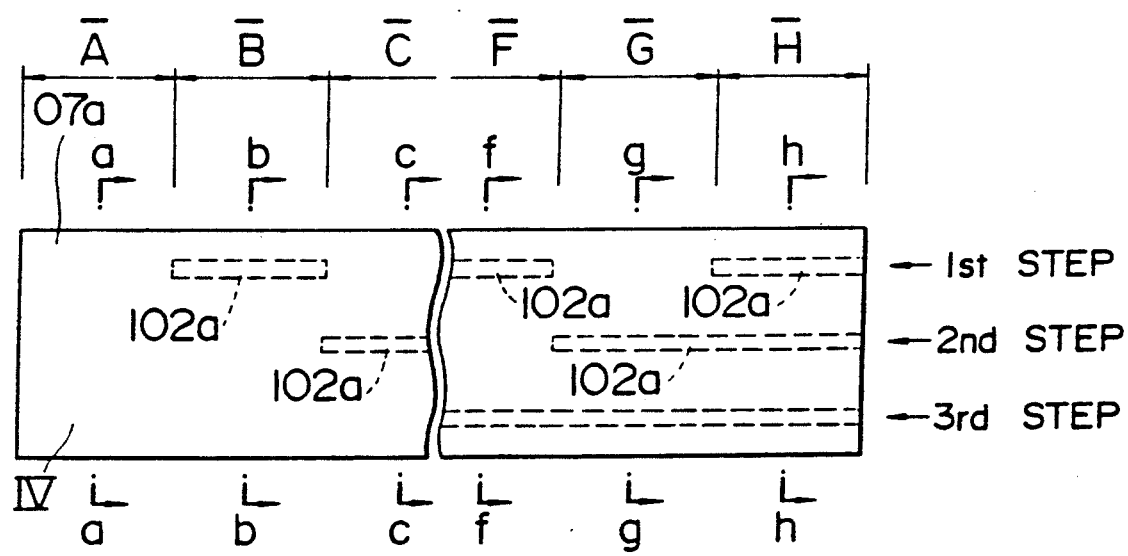
FIG. 13 is a development view of the outer circumference of a piston ring having wear resistant material coated thereover, with a circumferential groove of rectangular shape in cross-section being optionally arranged or not arranged at upper, middle and lower positions each of which corresponds with the vertical direction of the ring, by dividing the outer circumference of the ring into eight equal portions.
Figure 14:
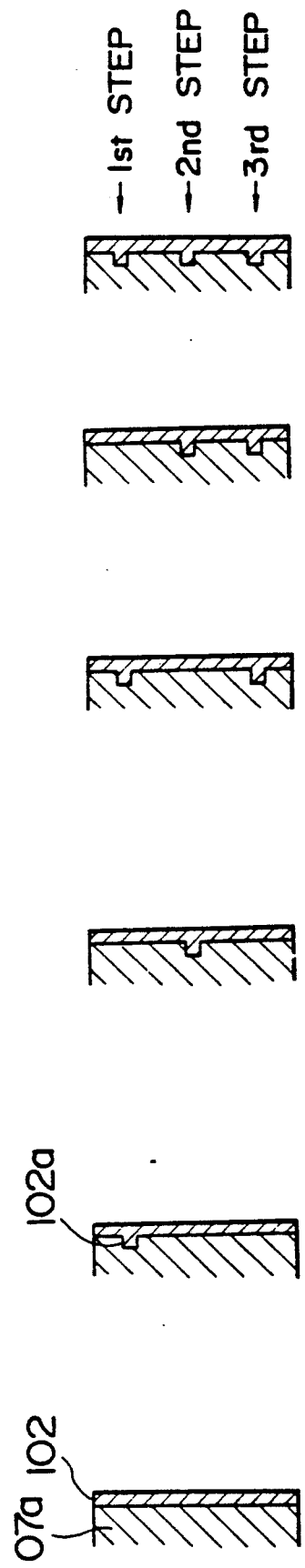
FIG. 14(a) is a cross-sectional view taken along the line a—a in FIG. 13.
FIG. 14(b) is a cross-sectional view taken along the line b—b in FIG. 13.
FIG. 14(c) is a cross-sectional view taken along the line c—c in FIG. 13.
FIG. 14(f) is a cross-sectional view taken along the line f—f in FIG. 13.
FIG. 14(g) is a cross-sectional view taken along the line g—g in FIG. 13.
FIG. 14(h) is a cross-sectional view taken along the line h—h in FIG. 13.

Referring to the fourth embodiment of the invention, its construction is identical as that shown in FIGS. 13 and 14, and the ring 07a with the wear resistant material 102 coated thereover has its outer circumference equally divided into eight portions, and two or three circumferential grooves of rectangular shape in cross-section are defined in the base metal underlaying the wear resistant material at three positions, i.e., the upper, the middle and the lower positions in the vertical plane of the ring 07a. Alternatively, such grooves may be omitted entirely.

The number and the positions of the grooves to be defined in the ring 07a are tabulated in Table 1 as set forth below. Respective values in a binary system are given in the left-most column in Table 1. This ring will be referred to as the ring IV.

TABLE 1

| Circumferential Position | First Stage | Second Stage | Third Stage | Binary System |
|---|---|---|---|---|
| A (0) | X | X | X | 000 |
| B (1) | 0 | X | X | 100 |
| C (2) | X | 0 | X | 010 |
| D (3) | 0 | 0 | X | 110 |
| E (4) | X | X | 0 | 001 |
| F (5) | 0 | X | 0 | 101 |
| G (6) | X | 0 | 0 | 011 |
| H (7) | 0 | 0 | 0 | 111 |

Numerals shown in parentheses are values in binary systems.
Symbols 0 and X indicate the presence and the absence of the groove respectively.

Figure 15:
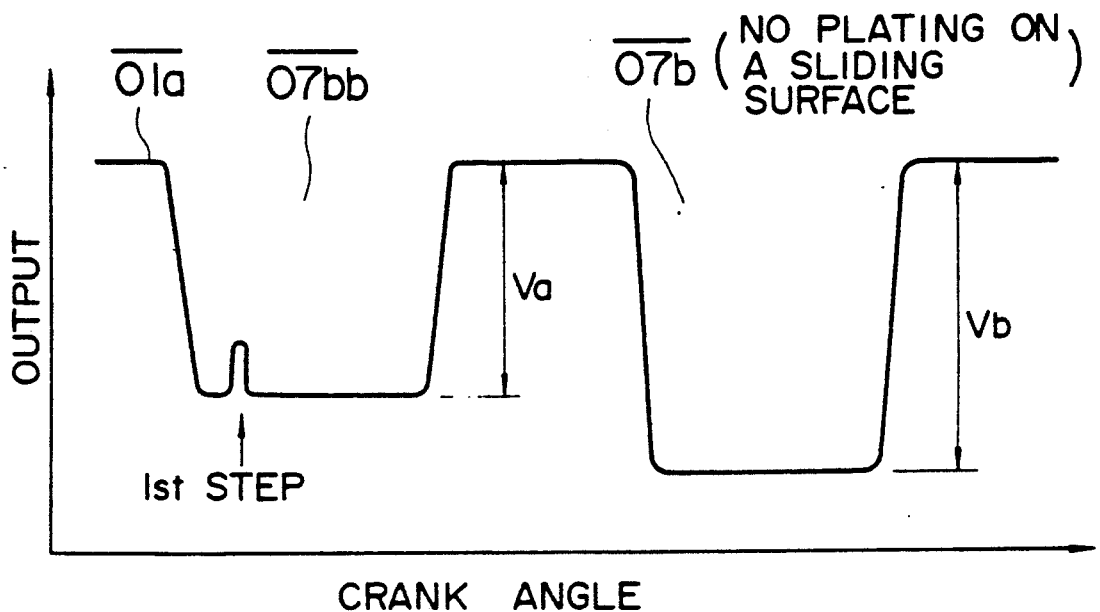
FIG. 15 is an output wave-form which corresponds with the portion of the piston-ring having the cross-sectional shape taken along the line b—b of the piston-ring in FIG. 13.
Figure 16:
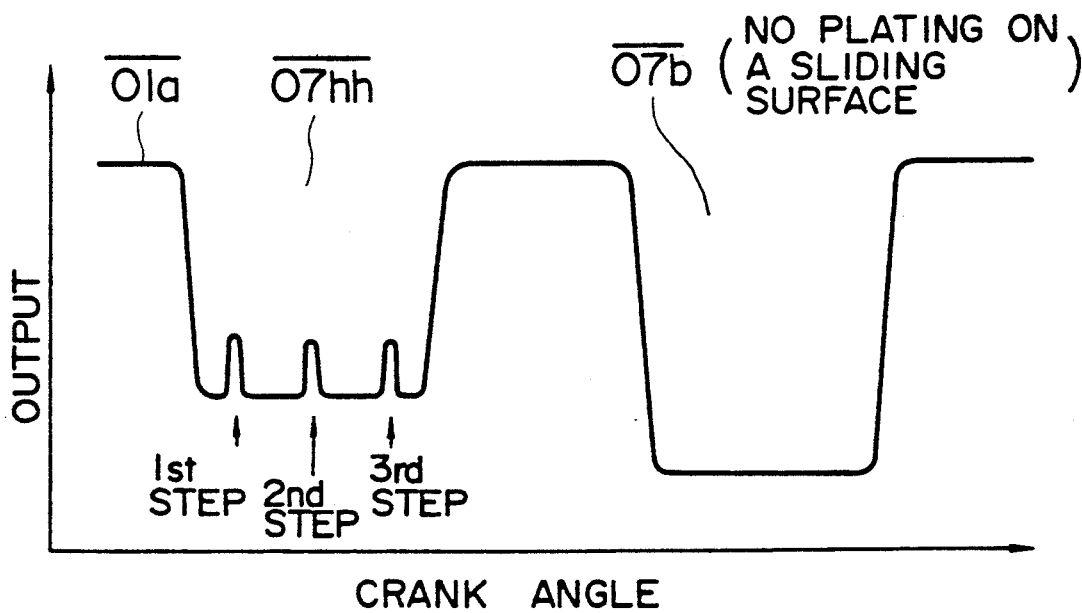
FIG. 16 is an output wave-form which corresponds with the portion of the piston-ring having the cross-sectional shape taken along the line h—h of the piston-ring in FIG. 13.
Figure 17:
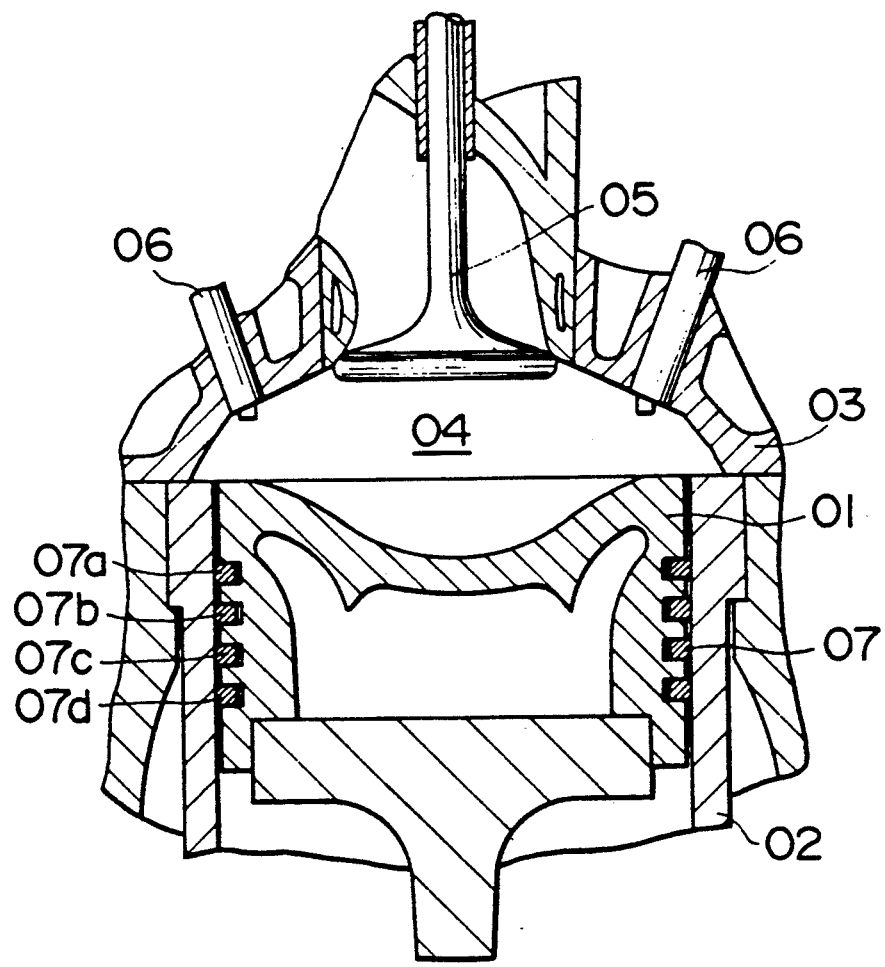
FIG. 17 is a view showing a combustion chamber in a prior art diesel engine, when the piston-ring is at its top dead center.

The operation of the fourth embodiment of the invention will be described hereinbelow. This ring IV is secured to the piston as the top ring, and wave forms which are outputted from the eddy current type displacement sensor 100 and subsequently displayed on the displaying device 115 are shown in FIGS. 15 and 16. If there is not stop means provided, the piston ring may continue its rotation about the piston shaft, and therefore an operator may not understand which part of the ring is being measured.

In FIG. 15, $\overline{01a}$ is an output wave-form which corresponds with the outer wall 01a, whereas $\overline{07bb}$ is an output wave-form which corresponds with the portion B as shown in FIG. 13, and $\overline{07b}$ is an output wave-form which corresponds with the ring 07b having no wear resistant material coating. In FIG. 16, 07hh is an output wave-form which corresponds with the portion $\overline{H}$ in FIG. 13. Wave-forms as shown in FIG. 15 and 16 are variable in their outputs in an inverse proportion with the thickness of the wear resistant material 102, and the image of circumferential grooves 102a which are defined over the surface of the base metal and have a rectangular shape in cross-section are superimposed on the wave-forms. Thus, the thickness of the wear resistant material can be obtained from the magnitude of variation in its output, and the amount and its position of wear can also be judged from the wave-forms of the groove, in the same manner as that for the second and the third embodiments. The salient feature of the invention in the fourth embodiment is that it relies on a binary system to facilitate the identification of the worn-out positions.

We claim:

1. An apparatus for diagnosing wear of the radially outer surfaces of a plurality of piston rings mounted on a piston reciprocating in a cylinder, comprising:
   a through-hole in a wall of said cylinder between the interior and exterior of said cylinder wall and disposed so that said piston rings pass over said hole at the interior of said cylinder wall during reciprocation of said piston;
   a plurality of discrete circumferentially extending areas on said radially outer surface of one of said piston rings for subdividing said radial outer surface, said discrete areas having a width in the direction of reciprocation of said piston;
   a discrete circumferentially extending groove in said radially outer surface of said one piston ring in at least some of said discrete areas; said grooves being disposed in a different position in the direction of said width relative to each of the other grooves so that said grooves provide separate reference means for each of said discrete areas;
   a wear resistant coating on said radially outer surface of said one of said piston rings;
   eddy current type displacement sensor means mounted in said through-hole having an inner end in spaced relationship to said radially outer surfaces of said pistons for emitting an output signal proportional to the distance between said sensor means and said radially outer surfaces of each piston ring;
   displacement measuring means connected to said sensor means for measuring displacement of said radially outer surface of said one piston ring in response to said output signals of said sensor means emitting signals representing measured values;
   calculating means connected to said displacement measuring means for calculating the differences between said measured value signals of said displacement measuring means indicating variations in the thickness of said wear resistant material and emitting output signals representing said differences; and
   indicating means connected to said calculating means for indicating said output signals from said calculating means, so that the wear of said piston rings is diagnosed from the measured thickness of said wear resistant material in each of said discrete areas.

2. A method of diagnosing wear of the radially outer surfaces of a plurality of piston rings mounted on a piston reciprocating in a cylinder comprising:
   subdividing said radially outer surface of one of said piston rings into a plurality of discrete circumferentially extending areas, said discrete areas having a width in the direction of reciprocation of said piston;
   providing a discrete circumferentially extending groove in said radially outer surface of said one piston ring in at least some of said discrete areas, said grooves being disposed in a different position in the direction of said width relative to each of the other grooves so that said grooves provide reference means representing each of said discrete areas;
   providing a wear resistant coating on said radially outer surface of said one of said piston rings;
   providing a hole through the cylinder wall having an inner end disposed so that said piston rings pass over said inner end during reciprocation of said piston;
   providing an eddy current type displacement sensor having an inner end in said hole so that said inner end of said sensor is displaced from said radially outer surfaces of said piston rings passing over said inner end of said hole;
   reciprocating said piston;
   sensing the distances between said radially outer surfaces and said inner end of said sensor and emitting output signals proportional to said distances;
   measuring the displacement of said radially outer surfaces of said piston rings in response to said output signals of said sensor and emitting output signals representing measured values of said displacement;
   calculating the thickness of said wear resistant coating from differences between measured values of displacement of said radially outer surface of said one piston ring and measured values of displacement of said radially outer surfaces of uncoated piston rings;
   indicating said differences in measured values; and
   diagnosing the wear of said radially outer surfaces of said piston rings from said indicated measured values representing variations in thickness of said wear resistant material in each discrete area on said one piston ring.

3. The method as claimed in claim 2 and further comprising:
   specifying said discrete areas on said one piston ring in binary numbers with "0" as an area having no groove and with "1" as an area having a groove therein.

* * * * *